(12) United States Patent
Belmont (10) Patent No.: US 9,428,095 B2
(45) Date of Patent: Aug. 30, 2016

(54) GLASS FASTENER SYSTEM

(71) Applicant: Jack A. Belmont, Olympia, WA (US)

(72) Inventor: Jack A. Belmont, Olympia, WA (US)

( * ) Notice: Subject to any disclaimer, the term of this patent is extended or adjusted under 35 U.S.C. 154(b) by 0 days.

(21) Appl. No.: 14/564,177

(22) Filed: Dec. 9, 2014

(65) Prior Publication Data

US 2015/0158410 A1 Jun. 11, 2015

Related U.S. Application Data

(60) Provisional application No. 61/913,559, filed on Dec. 9, 2013.

(51) Int. Cl.
*B65D 85/48* (2006.01)
*B60P 3/00* (2006.01)

(52) U.S. Cl.
CPC ........................................ *B60P 3/002* (2013.01)

(58) Field of Classification Search
CPC ..... B65D 85/48; B65D 49/06; B65D 49/062
USPC .................. 211/41.15, 186, 195, 198, 41.14; 248/440, 440.1; 280/639, 641; 410/2, 410/40
See application file for complete search history.

(56) References Cited

U.S. PATENT DOCUMENTS

| | | | | |
|---|---|---|---|---|
| 1,836,362 A * | 12/1931 | Crowley | ............ | B65G 49/062 108/55.1 |
| 2,005,009 A * | 6/1935 | Scheu | ................... | A01G 13/06 431/287 |
| 3,233,753 A * | 2/1966 | Samuel | ................ | B65D 85/48 206/454 |
| 3,253,852 A * | 5/1966 | Wheat | ................. | B65G 49/061 294/67.1 |
| 3,307,691 A * | 3/1967 | Vallebona | ............ | B65D 85/48 206/451 |
| 3,424,487 A * | 1/1969 | Pector | ................... | B60P 3/002 211/113 |
| 3,493,128 A * | 2/1970 | Silvert | ................ | B65G 49/062 108/53.1 |
| 3,878,942 A * | 4/1975 | Hansen | ............... | B65G 49/062 206/454 |
| 3,955,676 A * | 5/1976 | Hansen | ............... | B65G 49/062 206/451 |
| 4,188,168 A * | 2/1980 | Brown | ................ | B65G 49/062 294/74 |
| 4,278,171 A * | 7/1981 | Millhoan | ............ | B65G 49/062 206/451 |
| 4,304,336 A * | 12/1981 | Mays | ..................... | B60P 3/002 211/41.14 |
| 8,376,291 B1 * | 2/2013 | Groves | .................... | B25H 1/06 182/153 |

(Continued)

FOREIGN PATENT DOCUMENTS

BE WO 2013167263 A1 * 11/2013 ........... B65G 49/062
DE 3046593 A1 * 7/1982 ........... B65G 49/062

(Continued)

OTHER PUBLICATIONS

EP 0056751 A1 abstract, Published Jul. 28, 1982.*

*Primary Examiner* — H Gutman
(74) *Attorney, Agent, or Firm* — Bishop Diehl & Lee, Ltd.

(57) ABSTRACT

A system, device and method for securing large glass sheets to a rack for transportation with improved safety and efficiency over existing systems and methods. The system utilizes a unique swivel cap which can be retrofitted to an existing glass transportation rack having vertical supports secured to a transportable base surface so as to be capable of retaining a plurality of large glass sheets in a substantially upright or angled position. The swivel cap is positioned atop each vertical support, each swivel cap including at least one stud for anchoring a tie-down cable such that each anchored tie-down cable is capable of pivoting about the stud. A plurality of the tie-down cables are pivotably anchored by a first end to a stud and configured to releasably couple by a second end to the transportable base surface.

8 Claims, 8 Drawing Sheets

(56) References Cited

U.S. PATENT DOCUMENTS

| | | | | |
|---|---|---|---|---|
| 2008/0073304 A1* | 3/2008 | Corbett | ............... | B65G 49/062 211/198 |
| 2010/0206824 A1* | 8/2010 | Mantenuto | ............ | B65D 19/18 211/41.15 |
| 2011/0097186 A1* | 4/2011 | Gibson | ................ | B65D 85/48 414/800 |
| 2016/0106065 A1* | 4/2016 | Minze | ................... | A01K 13/00 248/440.1 |

FOREIGN PATENT DOCUMENTS

| | | | | |
|---|---|---|---|---|
| DE | 3131109 A1 | * | 3/1983 | ............. B65D 85/48 |
| DE | 3325881 A1 | * | 2/1984 | ............ B65G 49/062 |
| DE | 202014103799 U1 | * | 11/2015 | ............ B65D 19/44 |
| EP | 0056751 B1 | | 4/1985 | |
| FR | 2228011 A1 | * | 11/1974 | ............ B65D 85/48 |
| MX | CA 2321386 A1 | * | 3/2001 | ............ B65G 49/062 |

\* cited by examiner

GLASS FASTENER SYSTEM

RELATED APPLICATION

The present application claims the filing priority of U.S. Provisional Application No. 61/913,559 titled "Glass Fastener System" and filed on Dec. 9, 2013. The '559 Provisional Application is hereby incorporated by reference in its entirety.

TECHNICAL FIELD OF THE INVENTION

The present device relates to methods and devices for loading, securing and transporting glass panes. Particularly, the present device relates to the securing of stoce glass (large sheets of 144"×102") on a vehicle for transportation.

BACKGROUND OF THE INVENTION

Figure 1:
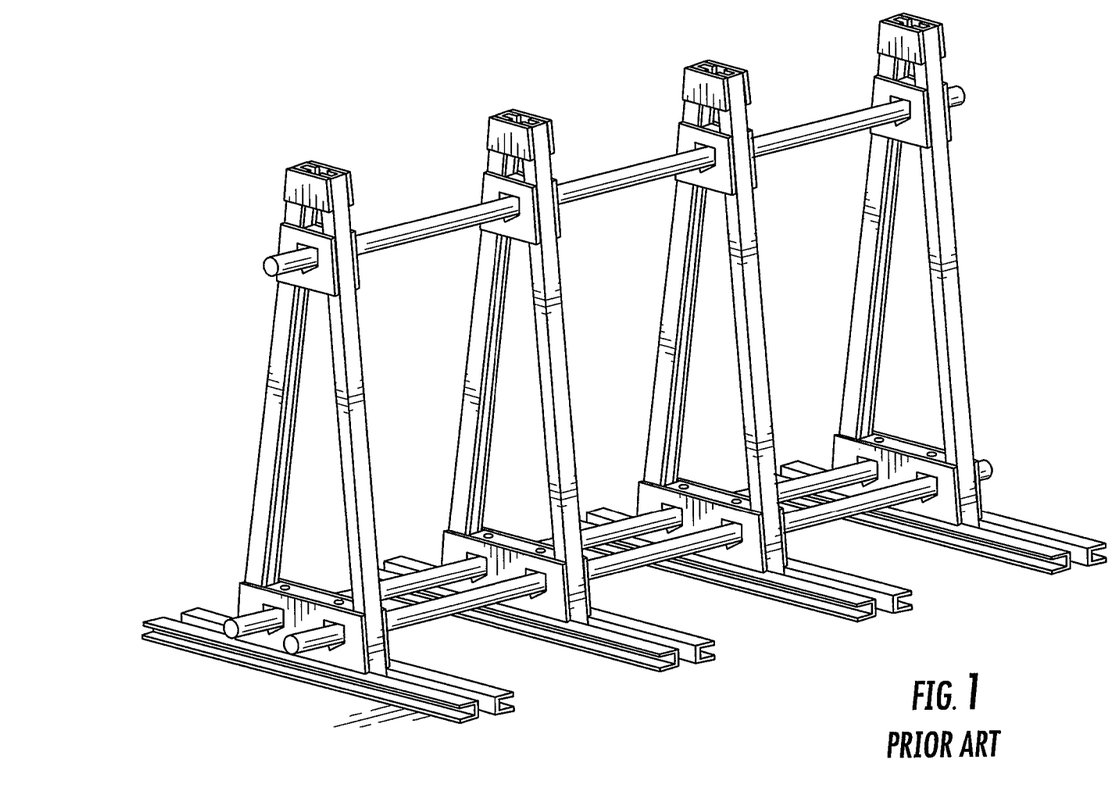
FIG. 1 is a perspective view of a PRIOR ART rack system for securing large sheets of glass for transportation.
Figure 2:
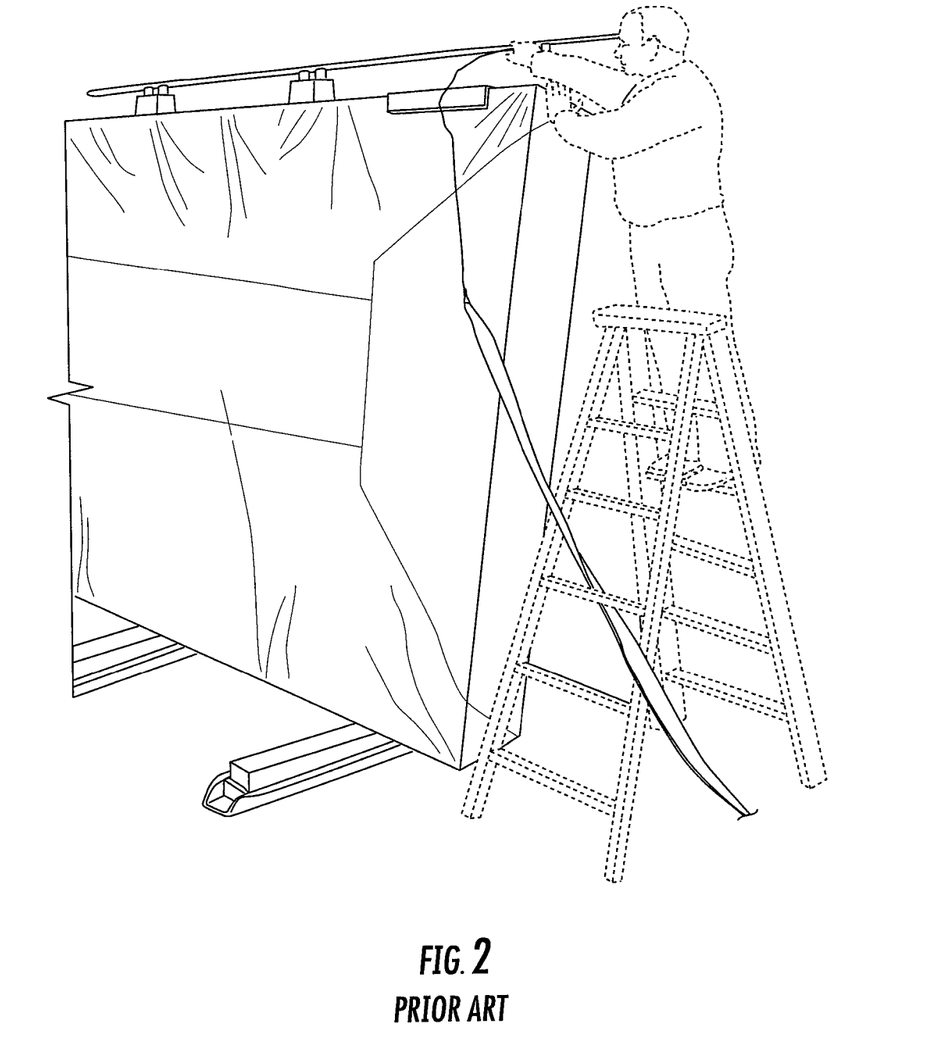
FIG. 2 is an illustration of the "tie down" process required in using a PRIOR ART rack system similar to that shown in FIG. 1.
Figure 3:
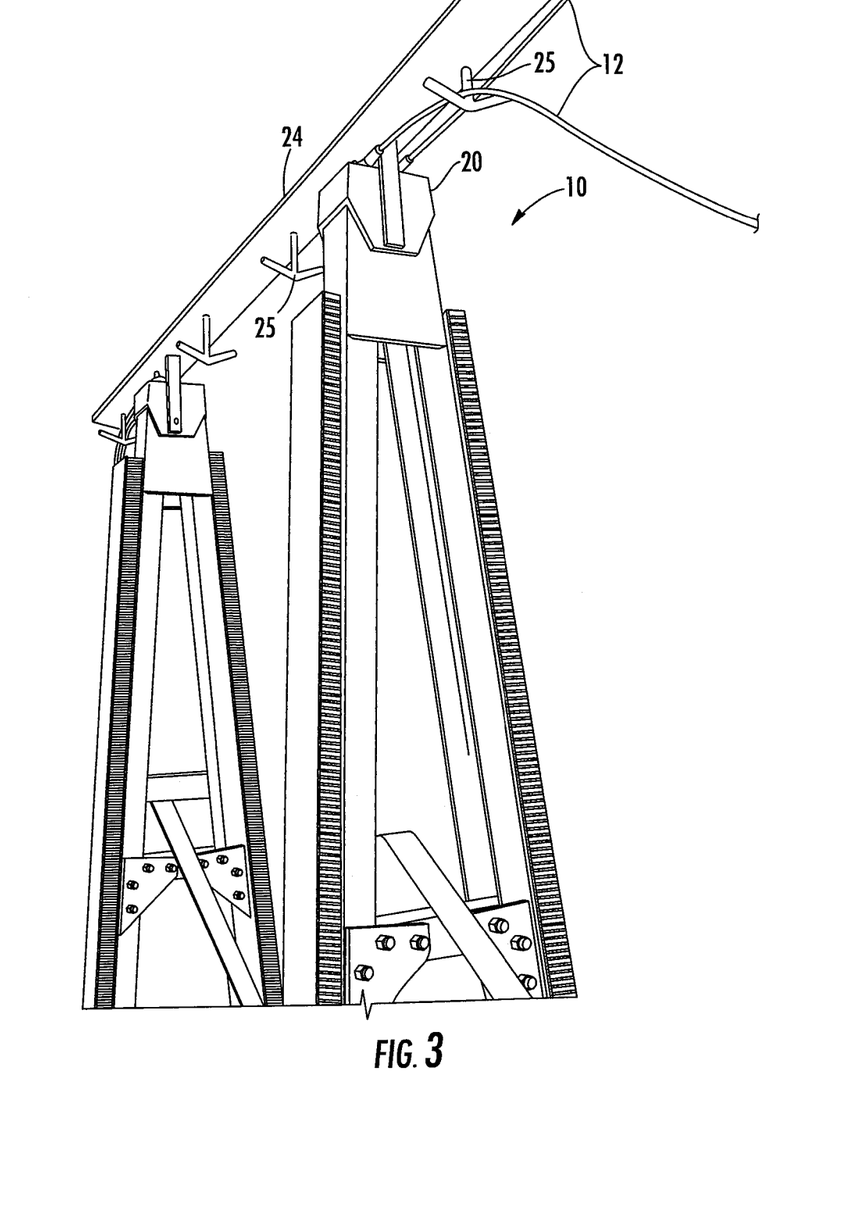
FIG. 3 is a perspective view of a partial embodiment of the present rack system for securing large sheets of glass for transportation.
Figure 4:
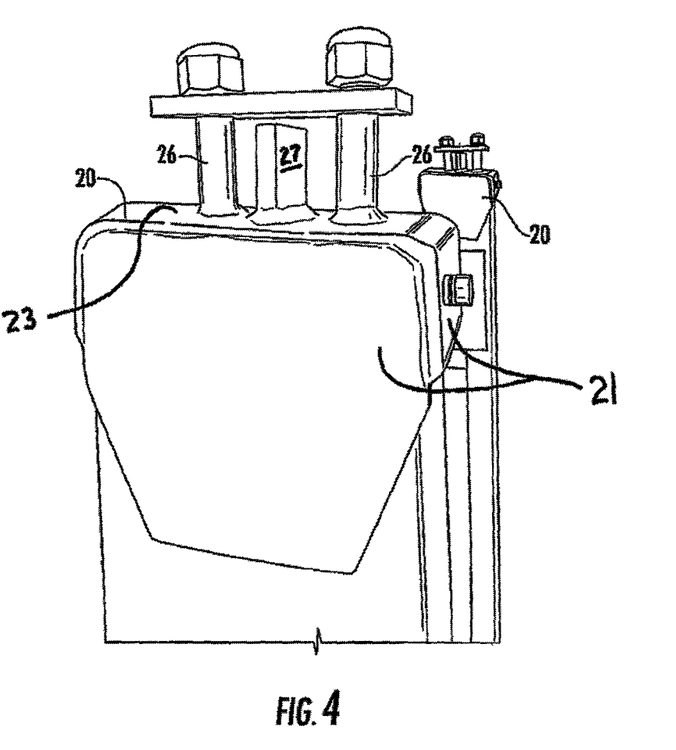
FIG. 4 is a perspective view of an embodiment of a swivel cap used in the rack system of FIG. 3.

When hauling stoce glass (large sheets 144"×102") the panes of glass are loaded onto a trailer-mounted rack (see FIG. 1) that must be secured to the trailer. When the rack is mounted on the trailer, the top of any glass panel positioned on the rack can be well-above the ground, making securing of the glass somewhat dangerous. For example, with reference to FIG. 2, prior systems and methods required a person to climb a tall ladder, reach outward toward the top edge of the glass and apply securing straps. In addition to being time consuming and labor-intensive to position and reposition the ladder, the method exposes a person to significant injury from sharp exposed edges of the glass sheets as well as from falling from the ladder.

These and other problems are addressed by the present device and methods to provide a system with numerous advantages in operation, safety and effectiveness.

SUMMARY OF THE INVENTION

There is disclosed herein a system, device and method for securing large glass sheets to a rack for transportation which avoids the disadvantages of prior devices while affording additional structural, safety and operating advantages.

Generally speaking, the system is comprised of a unique swivel cap which can be retrofitted to an existing glass transportation rack comprised of vertical supports secured to a transportable base surface so as to be capable of retaining a plurality of large glass sheets in a substantially upright or angled position.

In an embodiment, the swivel cap is positioned atop each vertical support, each swivel cap including at least one stud for anchoring a tie-down cable such that each anchored tie-down cable is capable of pivoting about the stud. A plurality of tie-down cables are pivotably anchored by a first end to a stud and configured to releasably couple by a second end to the transportable base surface.

In an embodiment, a horizontal sled is fastened to and extends across each swivel cap of the rack. A plurality of hooks fixed to an underside of the horizontal sled allow the tie-down cables to be retained in a position parallel to the sled and away from the area where glass sheets are placed.

In an embodiment of a swivel cap assembly, the swivel cap comprises a housing including a plurality of rigid sidewalls configured to secure the cap to a vertical support of the glass transportation rack, and an upper surface connected to the plurality of sidewalls. At least one and preferably two studs connected to the upper surface of the cap and at least one tie-down cable anchored to and capable of pivoting about the studs, complete the assembly.

These and other aspects and components of the invention may be understood more readily from the following description and the appended drawings.

BRIEF DESCRIPTION OF THE DRAWINGS

For the purpose of facilitating an understanding of the subject matter sought to be protected, there are illustrated in the accompanying drawings embodiments thereof, from an inspection of which, when considered in connection with the following description, the subject matter sought to be protected, its construction, operation, and many of its advantages should be readily understood and appreciated by those skilled in the art.

DETAILED DESCRIPTION OF PREFERRED EMBODIMENTS

While this invention is susceptible of embodiments in many different forms, there is shown in the drawings and appendices, and will herein be described in sufficient detail, at least one preferred embodiment of the invention with the understanding that the present disclosure is to be considered as an exemplification of the principles of the invention and is not intended to limit the broad aspect of the invention to any specific embodiments illustrated.

Referring now to FIGS. 3-12, there is illustrated embodiments an improved rack system 1 for securing large sheets of glass onto a trailer bed 40 for transporting. The system 1 includes a double-sided rack 10 secured to the floor of the trailer, multiple special tie-down cables 12, end retainers 14, side retainers 16, corner brackets 18, and multiple swivel caps 20 positioned at the apex of the rack 10. A custom rake 34 may be used in facilitating the glass securing process as well.

The rack 10, much like that of the prior art, is comprised of multiple angled supports (preferably in three pairs) forming an A-frame structure, and a horizontal sled 24 extending longitudinally along the apex of the structure. At the top of each pair of angled supports is mounted a swivel cap 20 having four rigid sidewalls 21 and an upper surface 23. The swivel cap 20 includes an upward stud 26 on each side of the upper surface 23 (i.e., two studs, though a single stud may suffice). A tie-down cable 12, preferably comprised of a steel cable portion, looped at one end, connected to a fabric portion, is pivotably attached by the cable portion to each stud 26. A stop 27 is positioned between the two studs 26 (see FIG. 4) to prevent crossing of corresponding tie-down cables on the two studs. A ratchet binder is used at the fabric portion of each tie-down cable 12 to secure and tighten to a floor bracket.

Figure 5:
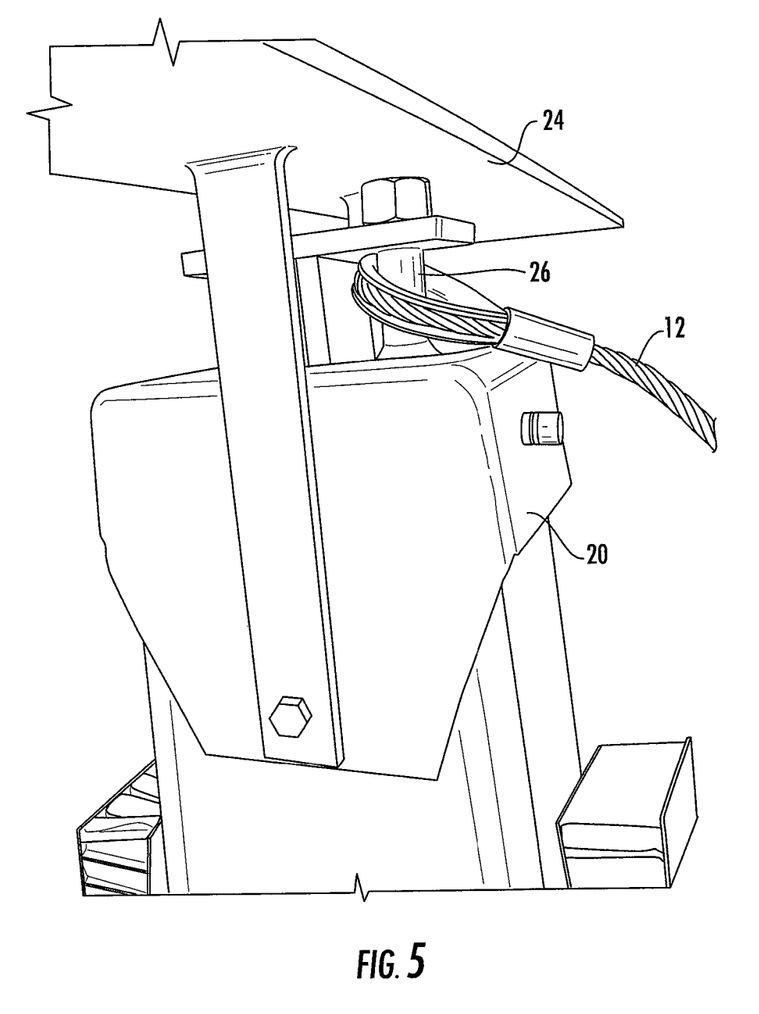
FIG. 5 is another perspective view of a swivel cap showing the attachment of a tie-down cable.
Figures 6, 7, 8:
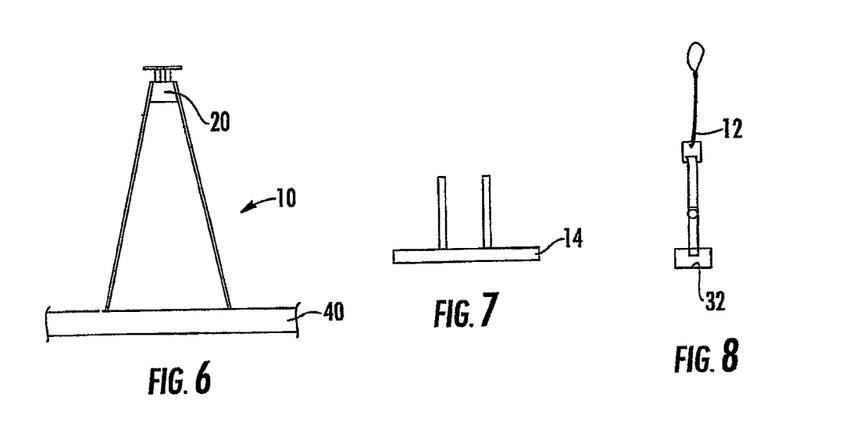
FIGS. 6-10 are illustrations of various components of an embodiment of the present rack system.
Figure 9:
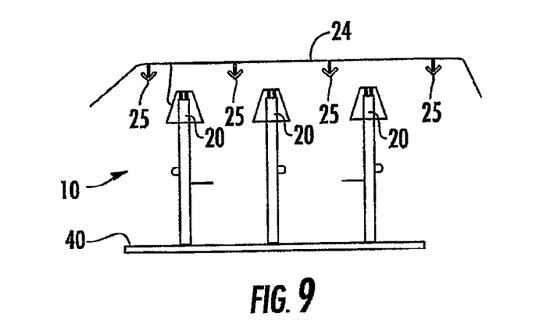
Figure 10:
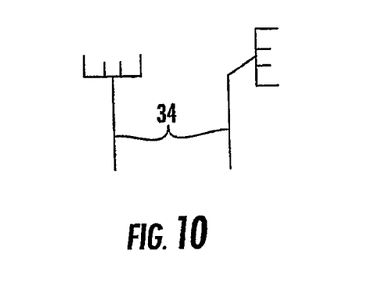
Figure 11:
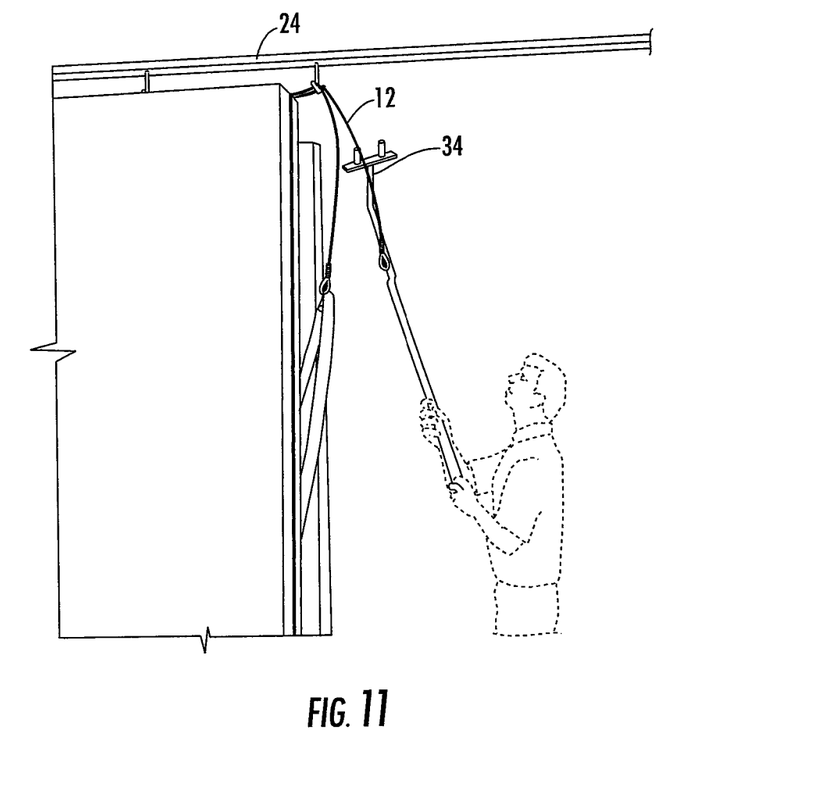
FIG. 11 is a side view illustrating the use of a rake to position tie-down cables.

As shown in FIG. 5, the looped end of the tie-down cable 12 is hooked to one of the upward studs 26 on a swivel cap 20. Accordingly, with three swivel caps per rack and two studs per cap, there are preferably six tie-down cables used for the preferred system.

A horizontal sled 24 may include several tie-down cable hooks 25 (FIG. 3) which are used to keep the tie-down cables 12 from getting tangled with one another during the securing process, as will be more readily understood below.

End retainers 14 (FIG. 7) and side retainers 16 (FIG. 12) are used to add a level of security to the preferred system 1. The end retainers 14 have two posts which slide into receiving ports located within the A-frame structure of the rack 10. The end retainers 14 prevent the glass sheets from moving laterally on the rack 10. The side retainers 16, of which there are preferably three per side, have a cushioned inner side which contacts the glass sheets and an outer side which may attach to a corresponding tie-down cable 12.

Optional floor tie-downs 32 (FIG. 8) slidingly couple to a track on the trailer floor transverse to the glass sheets and provide a securing point for each tie-down cable 12. As previously noted, a ratcheting binder (not shown) may be used on each tie-down cable 12 to cinch the cable taut. The taut cable biases and retains the side retainers 16 against the glass sheets. Six corner brackets (or edge guards) 18 may be placed on the top edge of the glass sheets to align with each side of the swivel caps 20 (see FIG. 12). The brackets/guards 18 keep the cable 12 from rubbing on the sharp glass edge where it can cause damage to the cable and/or glass.

Figure 12:
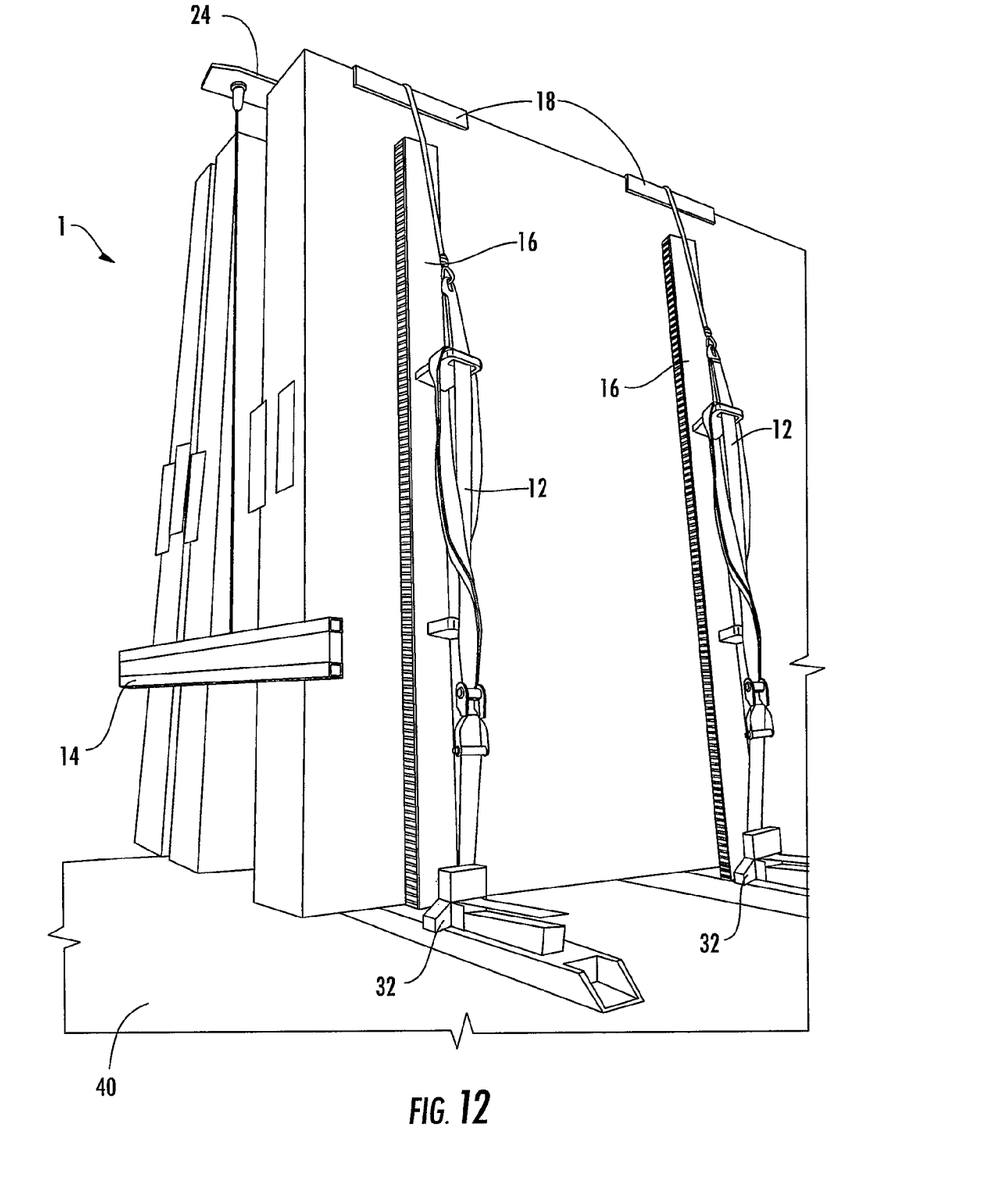
FIG. 12 is a perspective view of an embodiment of the present rack system in a finished state securing several large sheets of glass.

Fabric cables (not shown) secured within the rack structure and ratchet binders may also be used on the end retainers 16 to tighten and secure the end retainers 16 into contact with the edges of the glass sheets (see FIG. 12).

To secure the stoce glass after it is loaded on the rack 10, which is secured to a trailer bed, the user first uses a rake 34 (FIGS. 10 and 11) to properly position each of the six tie-down cables 12. The cables 12 loop over the upward studs 26 of the swivel caps 20 can be hooked onto any one of the holders 25 on the horizontal sled 24. The rake 34 can then be used to position the six edge guards 18 along the top edge of the glass in alignment with the swivel caps 20. This is accomplished by inserting the two inside tangs of the rake 34 into slots on the guards 18.

Next, each of the side retainers 16 is individually placed with a cushioned side against the glass and coupled to the corresponding tie-down cable 12. The cable portion of the tie-down cable should be centered across the corresponding edge guard 18. The floor tie-downs 32 are also slid into place to provide a connection point for each tie-down cable 12. The fabric portion of the tie-down 12 is then threaded through the corresponding ratchet binder and cinched as necessary.

Once all six side retainers 16 and side tie-downs cables 12 are properly secured, the end retainers 14 can be attached. First, the end retainer posts are aligned and slid into retaining ports to connect with the edge of the glass sheets. Then, fabric straps are threaded into the ratchet binders of the end retainers 14 and cinched to the desired tautness.

For removing the glass sheets, the above-process is reversed. The tie-down cables 12, edge guards 18, side retainers 16, end retainers 14 and all other loose components of the system can be stored within the A-frame structure of the rack 10 during transport, when not in use.

The invention consists of any combination of the described components. Not every embodiment of the invention need include each of the described components, or the same number of included components. For example, some embodiments may utilize only two swivels and four tie-downs, while others may find a use in more than three swivels and six tie-downs. A key to each embodiment is the ability to quickly and easily secure the loaded glass sheets without need of a ladder and without the increased risk of injury due to reaching across any part of the loaded glass sheets.

The matter set forth in the foregoing description and accompanying drawings and photos is offered by way of illustration only and not as a limitation. While particular embodiments have been shown and described, it will be apparent to those skilled in the art that changes and modifications may be made without departing from the broader aspects of applicants' contribution. The actual scope of the protection sought is intended to be defined in the following claims when viewed in their proper perspective based on the prior art.

What is claimed is:

1. A system for securing glass sheets for transportation, the system comprising:
    a rack comprised of at least two vertical supports secured to a transportable base surface so as to be capable of retaining a plurality of large glass sheets in a substantially upright or angled position;
    a swivel cap positioned at a top of each vertical support, each swivel cap including at least one stud for anchoring a tie-down cable such that each anchored tie-down cable is capable of pivoting about the stud;
    a horizontal sled fastened to and extending across each swivel cap with a plurality of hooks fixed to an underside; and
    a tie-down cable pivotably anchored by a first end to the at least one stud and configured to releasably couple by a second end to the transportable base surface.

2. The system of claim 1, wherein each swivel cap comprises two studs.

3. The system of claim 2, wherein each swivel cap comprises a stop extending between the two studs to prevent crossing of corresponding tie-down cables on the two studs.

4. The system of claim 1, further comprising side retainers configured to abut an outermost glass sheet in alignment with each swivel cap and connect to a tie-down cable to secure glass sheets to the rack.

5. The system of claim 1, wherein there are three swivel caps on the rack.

6. A swivel cap assembly for use with a sheet-glass transportation rack having a plurality of vertical supports, the swivel cap assembly comprising:
    a swivel cap comprising:
        a plurality of rigid sidewalls configured to secure the cap to a vertical support of the glass transportation rack;
        an upper surface connected to the plurality of sidewalls;
        at least one stud connected to the upper surface of the cap;
        at least one tie-down cable anchored to and capable of pivoting about the stud; and
        a horizontal sled fastened to and extending across each swivel cap with a plurality of hooks fixed to an underside for retaining a tie-down cable in a position parallel to the sled.

7. The swivel cap assembly of claim 6, wherein two studs are connected to the upper surface of the cap.

8. The swivel cap assembly of claim 7, further comprising a stop extending between the two studs.

\* \* \* \* \*